US011615339B2

(12) United States Patent
Badhwar et al.

(10) Patent No.: US 11,615,339 B2
(45) Date of Patent: Mar. 28, 2023

(54) AUTOMATED VERSIONING AND EVALUATION OF MACHINE LEARNING WORKFLOWS

(71) Applicant: EmbodyVR, Inc., San Mateo, CA (US)

(72) Inventors: Shruti Badhwar, San Mateo, CA (US); Faiyadh Shahid, San Mateo, CA (US); Nikhil Ratnesh Javeri, Sunnyvale, CA (US); Kapil Jain, Redwood City, CA (US)

(73) Assignee: EMBODYVR, INC., San Mateo, CA (US)

( * ) Notice: Subject to any disclaimer, the term of this patent is extended or adjusted under 35 U.S.C. 154(b) by 843 days.

(21) Appl. No.: 16/184,050

(22) Filed: Nov. 8, 2018

(65) Prior Publication Data

US 2019/0378052 A1 Dec. 12, 2019

Related U.S. Application Data

(60) Provisional application No. 62/681,590, filed on Jun. 6, 2018.

(51) Int. Cl.
*G06N 20/00* (2019.01)
*G06F 9/445* (2018.01)

(52) U.S. Cl.
CPC ......... *G06N 20/00* (2019.01); *G06F 9/44505* (2013.01)

(58) Field of Classification Search
CPC .............................. G06N 20/00; G06F 9/44505
See application file for complete search history.

(56) References Cited

U.S. PATENT DOCUMENTS

| | | |
|---|---|---|
| 8,099,480 B1 | 1/2012 | Muthusrinivasan et al. |
| 10,038,966 B1 * | 7/2018 | Mehra ................ G06K 9/00362 |
| 2008/0137870 A1 | 6/2008 | Nicol et al. |
| 2016/0078361 A1 * | 3/2016 | Brueckner .............. H04L 67/10 |
| | | 706/12 |
| 2016/0300156 A1 | 10/2016 | Bowers et al. |

(Continued)

OTHER PUBLICATIONS

Algazi, et al., "The CIPIC HRTF Database", 2001 IEEE Workshop on the Applications of Signal Processing to Audio and Acoustics, pp. 99-102. IEEE, 2001.

(Continued)

*Primary Examiner* — Jennifer N Welch
*Assistant Examiner* — Amy P Hoang

(57) ABSTRACT

An application such as a machine learning workflow manager executes a machine learning workflow utilizing varying sets of parameters and tracks the utilized parameters and performance metrics for each execution. The manager generates a unique experiment identifier (ID) for each set of parameters used for executing a workflow and stores the experiment ID and the set of parameters along with results of the execution, e.g., performance metrics, output data, program code, etc. In some implementations, the manager can algorithmically generate sets of parameters for experiments of the workflow. Once experimentation for the workflow is complete, the manager utilizes the stored performance metrics to identify an experiment which exhibited the best performance and can retrieve the set of parameters, output data, or generated program code for deployment of the workflow using the associated experiment ID.

16 Claims, 5 Drawing Sheets

(56) References Cited

U.S. PATENT DOCUMENTS

| | | | |
|---|---|---|---|
| 2016/0358101 A1 | 12/2016 | Bowers et al. | |
| 2016/0358103 A1* | 12/2016 | Bowers | G06N 20/00 |
| 2019/0205792 A1* | 7/2019 | Huang | G06F 9/4881 |
| 2019/0236485 A1* | 8/2019 | Stanley, III | G06N 3/006 |

OTHER PUBLICATIONS

Alvez-Pinto, et al., "Perception and Coding of High-Frequency Spectral Notches: Potential Implications for Sound Localization", Frontiers in neuroscience, 8:112, 2014.

Bass, et al., "DevOps: A Software Architect's Perspective", Addison-Wesley Professional, 2015.

Bilinski, et al., "HRTF Magnitude Synthesis Via Sparse Representation of Anthropometric Features", 2014 IEEE International Conference on Acoustics, Speech and Signal Processing (ICASSP), pp. 4468-4472. IEEE, 2014.

Chodorow, "MongoDB: The Denitive Guide: Powerful and Scalable Data Storage", O'Reilly Media, Inc., 2013.

Davis, et al., "Effective DevOps: Building a Culture of Collaboration, Affinity, and Tooling at Scale", O'Reilly Media, Inc., 2016.

Garcia-Garcia, et al., "A Review on Deep Learning Techniques Applied to Semantic Segmentation", arXiv preprint arXiv:1704.06857, 2017.

Github, "Apache Airflow (Incubating)", [online] retrieved on Oct. 25, 2018 from <https://github.com/apache/incubator-airflow>.

Github, "Luigi", [online] retrieved on Oct. 25, 2018 from <https://github.com/spotify/luigi>.

Github, "Pinball", [online] retrieved on Oct. 25, 2018 from <https://github.com/pinterest/pinball>.

Grijalva, et al., "A Manifold Learning Approach for Personalizing HRTFS From Anthropometric Features", IEEE/ACM Transactions on Audio, Speech and Language Processing (TASLP), 24(3):559-570, 2016.

Hu, et al., "HRTF Personalization Based on Artificial Neural Network in Individual Virtual Auditory Space", Applied Acoustics, 69(2):163-172, 2008.

Huang, et al., "HRIR Personalisation Using Support Vector Regression in Independent Feature Spa", Electronics letters, 45(19):1002-1003, 2009.

Hugeng, et al., "Improved Method for Individualization of Head-Related Transfer Functions on Horizontal Plane Using Reduced Number of Anthropometric Measurements", arXiv preprint arXiv:1005.5137, 2010.

Kaneko, et al., "Deepearnet: Individualizing Spatial Audio With Photography, Ear Shape Modeling, and Neural Networks", in Audio Engineering Society Conference: 2016 AES International Conference on Audio for Virtual and Augmented Reality. Audio Engineering Society, 2016.

Li, et al., "HRTF Personalization Modeling Based on RBF Neural Network", 2013 IEEE International Conference on Acoustics, Speech and Signal Processing (ICASSP), pp. 3707-3710. IEEE, 2013.

Meshram, et al., "P-HRTF: Efficient Personalized HRTF Computation for High-Fidelity Spatial Sound", 2014 IEEE International Symposium on Mixed and Augmented Reality (ISMAR), pp. 53-61. IEEE, 2014.

Pflug, et al., "Ear Biometrics: A Survey of Detection, Feature Extraction and Recognition Methods", IET biometrics, 1(2):114-129, 2012.

Ravindran, et al., "Ear Contour Detection and Modeling Using Statistical Shape Models", All Theses. Clemson University TigerPrints, 2014.

Richards, "Software Architecture Patterns", O'Reilly Media, Incorporated, 2015.

Tashev, "HRTF Phase Synthesis Via Sparse Representation of Anthropometric Features", in Information Theory and Applications Workshop (ITA), 2014, pp. 1-5. IEEE, 2014.

Viola, et al., "Rapid Object Detection Using a Boosted Cascade of Simple Features", in Proceedings of the 2001 IEEE Computer Society Conference on Computer Vision and Pattern Recognition. CVPR 2001. vol. 1, pp. I-8. IEEE, 2001.

Yamamoto, et al., "Fully Perceptual-Based 3D Spatial Sound Individualization With an Adaptive Variational Autoencoder", ACM Transactions on Graphics (TOG), 36(6):212, 2017.

PCT Application Serial No. PCT/US2018/059769, International Search Report, dated Mar. 11, 2019, 3 pages.

PCT Application Serial No. PCT/US2018/059769, Written Opinion, dated Mar. 11, 2019, 9 pages.

* cited by examiner

US 11,615,339 B2

AUTOMATED VERSIONING AND EVALUATION OF MACHINE LEARNING WORKFLOWS

CROSS-REFERENCE TO RELATED APPLICATIONS

This disclosure claims the benefit of priority under 35 U.S.C. § 119(e) of U.S. Provisional Application No. 62/681,590 filed Jun. 6, 2018, entitled "An End to End System for Automated Versioning and Evaluation of Machine Learning Workflows," the contents of which is herein incorporated by reference in its entirety.

BACKGROUND

The disclosure generally relates to the field of data processing, and more particularly to software development, installation, and management.

Machine learning is a field of artificial intelligence that involves learning from data and deriving inferences based on data. In general, machine learning can use statistical techniques to give computer systems the ability to "learn" (e.g., progressively improve performance on a specific task) from data, without being explicitly programmed. Machine learning can be performed by utilizing various models or algorithms. These models can include a number of configurable settings or parameters which affect the performance and function of the model.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to evaluating workflows comprising one or more machine learning tasks in illustrative examples. Aspects of this disclosure can be also applied to evaluating workflows which include additional tasks not considered to be within the realm of machine learning, such as data formatting/manipulation, simulation and modeling, etc. In other instances, well-known instruction instances, protocols, structures and techniques have not been shown in detail in order not to obfuscate the description.

Overview

A workflow based on machine learning can involve several machine learning algorithms or components. Given the complexity of some workflows, identifying parameters for a workflow which produce optimal performance may require trying multiple machine learning approaches/experiments. Evaluating and optimizing a workflow can be a time-consuming process often requiring work from multiple data scientists and developers. An application such as a machine learning workflow manager executes a workflow utilizing varying sets of parameters and tracks the utilized parameters and performance metrics for each execution. In this way, the manager can automate the process for evaluating different configurations to identify optimal parameters for the workflow. The manager generates a unique experiment identifier (ID) for each set of parameters used for executing a workflow and stores the experiment ID and the set of parameters along with results of the execution, e.g., performance metrics, output data, program code, etc. Prior to performing an execution of a workflow, the manager can generate the experiment ID using indicated parameters and compare the experiment ID to stored experiment IDs. If a match is discovered, the manager determines that the workflow has already been executed and can prevent executing the workflow again with the same parameters. This prevents a developer from wasting resources to execute and evaluate a workflow using a set of previously executed parameters.

In some implementations, the manager can algorithmically generate sets of parameters for experiments of the workflow. For example, the manager may use a brute force search algorithm to execute all possible combinations of parameters or may use a genetic algorithm to generate and test candidate sets of parameters. Once experimentation on the workflow is complete, the manager utilizes the stored performance metrics to identify an experiment which exhibited the best performance and can retrieve the set of parameters, output data, or generated program code for deployment of the workflow using the associated experiment ID.

Example Illustrations

Figure 1:
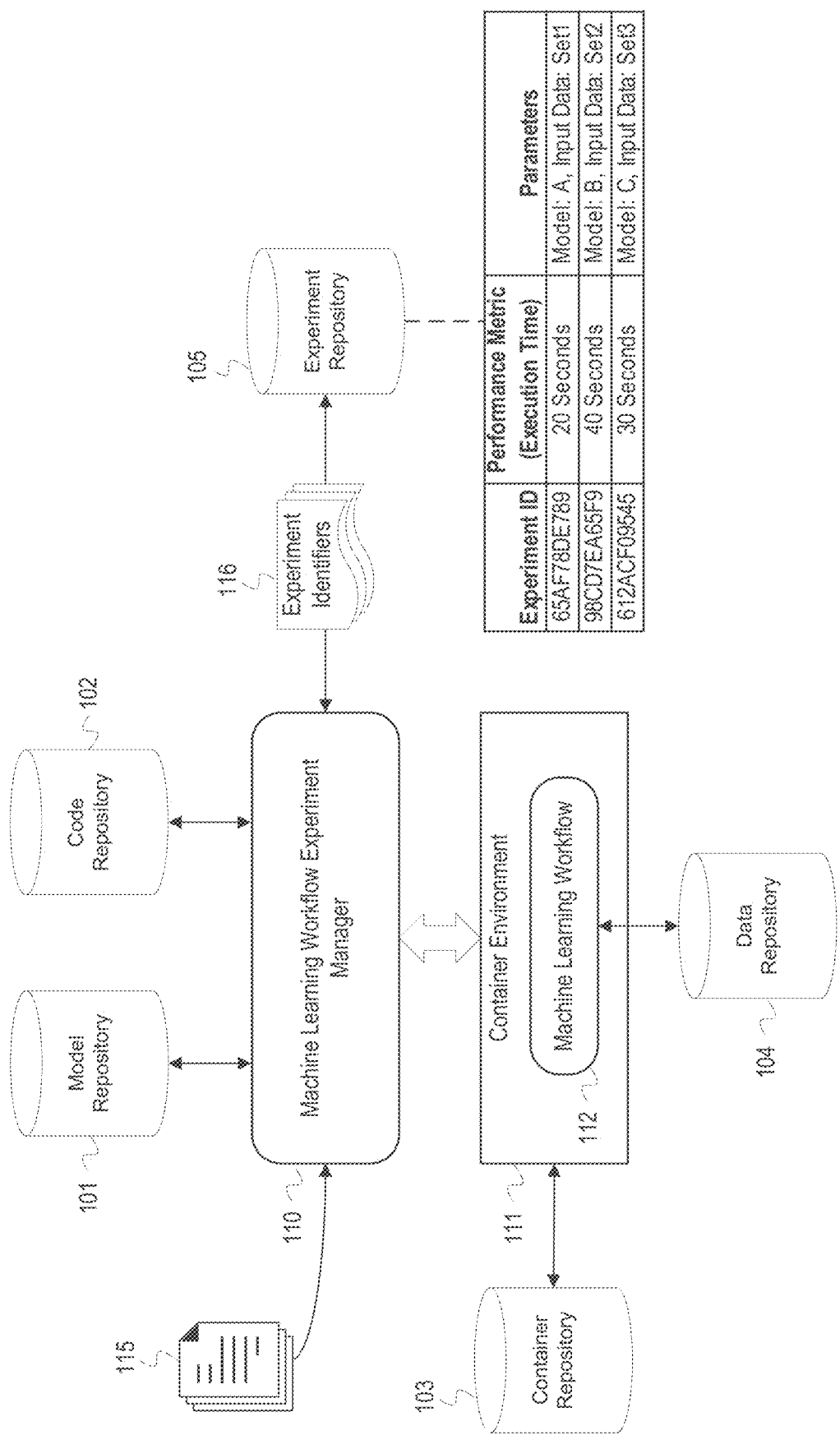
FIG. 1 depicts an example system for evaluation of machine learning workflows.

FIG. 1 depicts an example system for evaluation of machine learning workflows. FIG. 1 includes a machine learning workflow experiment manager 110 ("manager 110") which is communicatively coupled to a model repository 101, a code repository 102, and an experiment repository 105. The model repository 101 stores various machine learning models which can be selected for performing machine learning tasks of a workflow. The code repository 102 stores program code related to machine learning workflows, such as program code for coordinating execution of workflows or program code generated as a result of executing a workflow. The experiment repository 105 stores performance metrics, parameters, and/or identifiers for experimental executions of a workflow. The manager 110 can also access a container repository 103 including container images for instantiating a container environment 111 which is utilized to execute a machine learning workflow 112 ("workflow 112"). The manager 110 can also access a data repository 104 or configure the container environment 111 and the workflow 112 to retrieve input data from the data repository 104 for execution of the workflow 112.

The manager 110 is an application which coordinates and tracks the execution of various iterations of a machine learning workflow. A machine learning workflow, sometimes referred to as a pipeline, can include one or more machine learning tasks, e.g., object recognition, voice recognition, navigation, etc. In FIG. 1, the manager 110 coordinates the execution of the workflow 112. The manager 110 may include a user interface which allows a developer to input or define the workflow 112. For example, the manager 110 may allow a developer to select a program code file from the code repository 102 which specifies the workflow 112 and the tasks to be executed. In some implementations, the manager 110 itself may be a script or process programmed specifically for executing and tracking the workflow 112. For example, program code from the code repository 102 may be compiled and invoked by another process to serve as the manager 110 for the workflow 112. The code repository 102 can be equipped with a versioning system so that different versions of the manager 110 and other program code can be tracked.

The manager 110 receives one or more configuration files 115 which specify parameters for constructing and executing the workflow 112. The configuration files 115 can identify code from the code repository 102 to be used for executing the workflow 112, models in the model repository 101 to be used for tasks in the workflow 112, a container image to be used for the container environment 111, and input data to be retrieved from the data repository 104 and input into the workflow 112. Additionally, the configuration files 115 can identify model parameters or settings. The model repository 101 includes machine learning models based on different classifiers/algorithms, e.g., neural networks, nearest neighbor, random forests, etc. One or more of the models may have been previously trained or configured for a particular task, e.g., a classifier for determining whether an image depicts a cat or a dog. Model files can be persisted after training and can be later loaded during execution of the workflow 112. The model files can be modified, compressed, and/or transferred to other systems. Additionally, the models may be used to initiate weights, e.g., weights on neural network nodes, or configurations of other models. The models can include executable files or program code for performing an algorithm, such as an algorithm for generating a Bayesian network. Additionally, a model in the model repository 101 may be a JavaScript object notation (JSON) document or extensible markup language (XML) file which specifies settings for instantiation of a machine learning model. The models have different parameters or settings which affect their execution. For example, an image classifier may include settings for indicating which filters are to be applied to an image, and a neural network can include settings for specifying a number of input nodes, hidden layers, and output nodes in the network.

Each of the configuration files 115 may specify a different set of parameters. Each set of parameters for executing the workflow 112 can be referred to as an experiment. The manager 110 performs the "experiment" by executing the workflow 112 in accordance with a set of parameters indicated in a configuration file. There may be a one-to-one relationship between a configuration file and an executed experiment, i.e., each configuration specifies parameters for a single experiment. In some instances, a configuration file may specify a range or multiple possible values for each parameter. For example, a configuration file may specify a range for an amount of memory to be allocated to the container environment 111 or may specify multiple algorithms which can be used for a task. Based on these variable parameters, the manager 110 can automatically generate multiple unique experiments. For example, if a first parameter has possible values of A and B and a second parameter has possible values of 1 and 2, the manager 110 may execute the workflow 112 four times using the different possible combinations of parameters (i.e., A-1, B-1, A-2, and B-2). By executing each possible set of parameters, the manager 110 is essentially performing a brute force search for identifying a best performing combination of parameters. The manager 110 can also use other techniques for identifying a best performing combination of parameters such as an evolutionary or genetic algorithm. When using a genetic algorithm, the manager 110 generates populations of candidate solutions using the parameters identified in the configuration files 115, each candidate solution being a unique set of parameters for executing the workflow 112. The manager 110 can generate more solutions using crossover or mutation. For example, the manager 110 may generate a candidate solution by taking parameters for a first task from a first configuration file and taking parameters for a second task from a second configuration file. Selection of candidate solutions for each successive generation can be determined based on ranking the candidate solutions in accordance with the performance metrics observed during execution of the workflow 112. The manager 110 continues the selection and generation of successive populations until a termination condition has been reached. For example, the manager 110 may continue until a threshold for a performance metric of the workflow 112 has been satisfied.

To track which experiments have been performed, the manager 110 generates an experiment ID based on parameters used in each execution of the workflow 112 and stores the experiment IDs 116 and associated parameters in the experiment repository 105. The experiment ID may be based on parameters such as an identifier for input data from the data repository 104, an identifier for a model from the model repository 101, and the model settings. The manager 110 can be programmed with a list of identifiers for parameters to be used in generation of the experiment ID. The manager 110 may sort the selected parameters, convert them into a string, and hash the string to generate an experiment ID. The hashing can be performed using hashing algorithms such as the Secure Hash Algorithm (SHA) or a message-digest algorithm (e.g., MD5). Various implementations for generating a unique identifier for an experiment are possible. For example, the manager 110 can hash an entire configuration file or vary which parameters are included in a string or other data structure to be hashed. In general, the experiment IDs 116 are generated in a manner so that each experiment ID is unique for each unique set of parameters. Changing a single parameter, such as a code version to be executed, should result in a unique experiment ID.

To perform an experiment/execution of the workflow 112, the manager 110 may select a first configuration file from the configuration files 115 and parse the first configuration file to identify the parameters to be used, such as a model from the model repository 101, a container image from the container repository 103, and input data from the data repository 104. The manager 110 generates an experiment ID based on parameters in the first configuration file and queries the experiment repository 105 using the experiment ID or otherwise compares the experiment ID to experiment IDs in the experiment repository 105. If the query returns a result or a match is found, the manager 110 determines that the experiment, i.e., the set of parameters indicated in the first configuration file, have already been executed. If the experiment has already been executed, the manager 110 selects a next configuration file/experiment for execution. If the experiment has not been executed, i.e., the set of parameters are unique, the manager 110 continues with execution by cloning a container image identified in the first configuration file and instantiating the container environment 111. The container environment 111 includes resources, libraries, binaries, etc., that are needed to execute the workflow 112. The manager 110 instantiates and invokes the workflow 112 within the container environment 111. For example, the manager 110 may load program code for performing the workflow 112 from the code repository 102 into the container environment 111 and invoke the program code. The manager 110 may also load into the container environment 111 the identified models and the input data from the data repository 104. In some implementations, the manager 110 may load a model for a first task of the workflow 112 and execute the model within the container environment 111. The manager 110 may then load a model for a second task and input data generated as a result of executing the first task into the model for the second task. The manager 110 can reformat data to be in a format suitable for input into the second task or otherwise process the data. In some instances, machine learning tasks may be executed in parallel, and the manager 110 or program code for executing the workflow 112 can include ensemble logic for combining the generated results. After execution of the experiment is complete, the manager 110 stores any output data from the workflow 112 in a file labeled with the associated experiment ID in the data repository 104. The manager 110 can also store/commit any program code generated as a result of the workflow 112 in the code repository 102 along with the experiment ID.

To track performance of the workflow 112, the manager 110 may instantiate an agent within the container environment 111 to monitor the workflow 112 and record performance metrics such as a total execution time. In some implementations, the manager 110 analyzes output data from the workflow 112 and compares the output to expected results. The manager 110 can generate metrics from this analysis such as a mean square error or a percentage of correct outputs from the workflow 112. The performance metrics are stored in the experiment repository 105 and associated with the corresponding experiment ID. As shown in FIG. 1, the experiment repository 105 includes experiment IDs in hexadecimal format associated with example execution time performance metrics. The performance metrics may also include mean square error, accuracy, etc.

After experiments of the workflow 112 have been performed, the manager 110 outputs an experiment ID or a set of parameters which resulted in the best performing iteration of the workflow 112. The manager 110 can sort the experiment repository 105 based on the performance metrics to identify the best performing experiment. In some implementations, the manager 110 may output all experiments which satisfy a performance threshold. When outputting one or more experiments, the manager 110 can retrieve the output data using the experiment ID from the data repository 104 so that a developer can view the data and verify the performance of the workflow. The manager 110 may also retrieve and supply for deployment generated program code which has been tagged with the experiment ID.

FIG. 1 depicts a number of separate repositories to illustrate the various types of data and resources which can be utilized in the execution of machine learning workflows. The organization, storage, and location of these repositories can vary among implementations. For example, the repositories may be stored in the cloud, stored on premises in a local storage system, or a combination thereof. The model repository 101 may be implemented using a document database or key-value store. The data repository 104 may be a relational database which can be queried using a structured query language (SQL). The data repository may also be a file storage system (for example Elastic File Storage), such that data is readily available to the container environment 111 when the storage is mounted. In some implementations, each of the repositories can be stored in a single database or storage system. For example, each repository may be a different table in a relational database.

Similar to the repositories, the operations described above in relation to FIG. 1 can occur at one or more devices/locations. The operations can be executed on a single device, executed on multiple devices, executed in the cloud, or a combination thereof. For example, the manager 110 may execute on a local computing device and instantiate the container environment 111 in the cloud using cloud computing resources or on a remote computing device.

Figure 2:
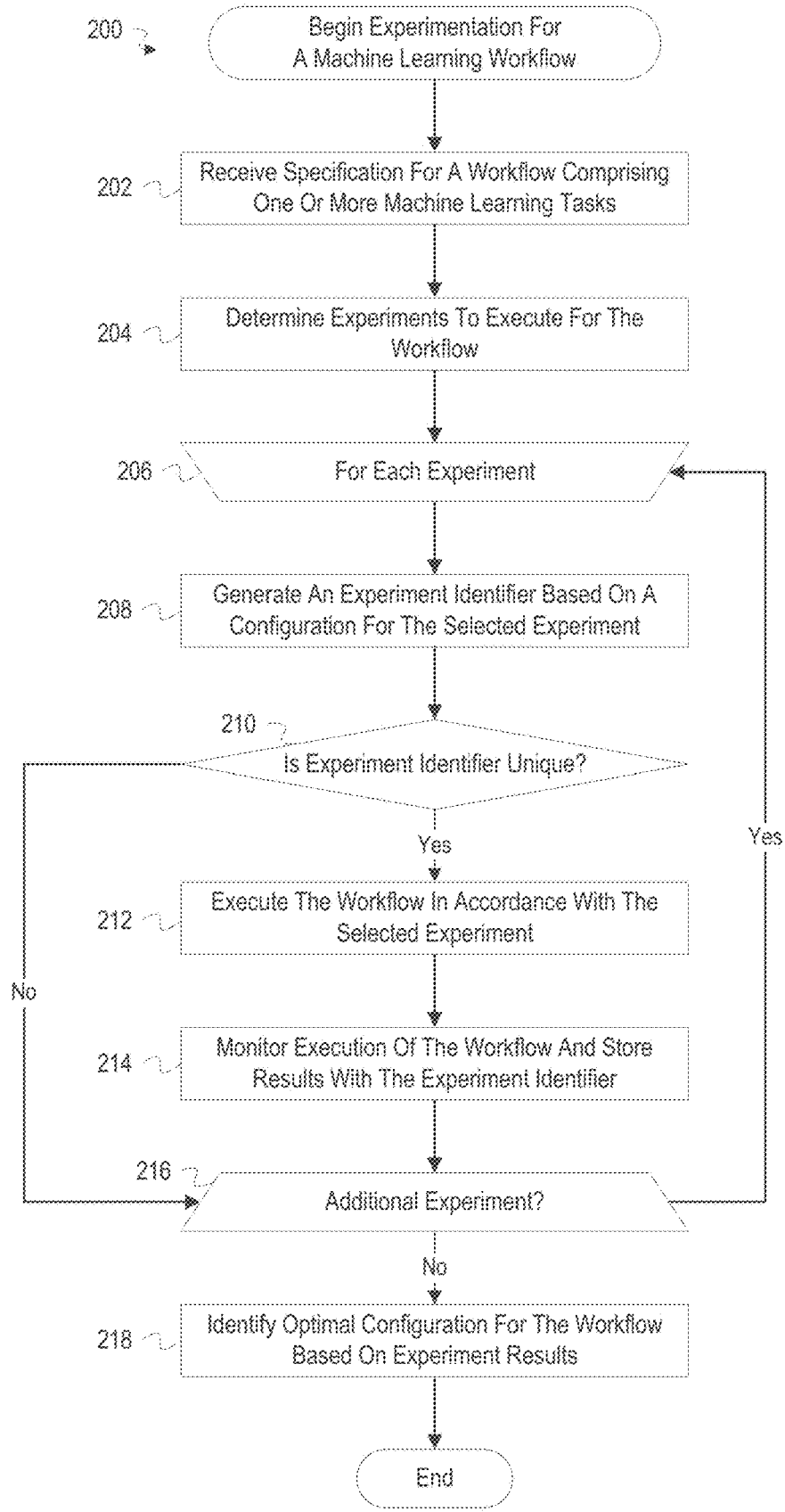
FIG. 2 depicts a flowchart with example operations for performing experimentation for a machine learning workflow.

FIG. 2 depicts a flowchart 200 with example operations for performing experimentation for a machine learning workflow. FIG. 2 refers to a manager as performing the operations for naming consistency with FIG. 1, although naming of program code can vary among implementations.

A machine learning workflow manager ("manager") receives a specification for a workflow comprising one or more machine learning tasks (202). The manager may be programmed with a general framework for executing machine learning tasks specified in a configuration file or may be customized for performing a workflow intended for a specific application. The program code for the manager may be loaded from a code repository and executed by a developer.

The manager determines experiments to execute for the workflow (204). An experiment is a set of parameters or a configuration which is applied for execution of a workflow. The manager may read and parse one or more configuration files to identify sets of parameters for experiments to be executed. Additionally, the manager can determine unique combinations of parameters based on ranges or lists of potential values for each parameter. Furthermore, in some implementations, the manager may utilize a genetic algorithm to generate candidate solutions/sets of parameters using mutation or crossover.

The manager begins execution of the workflow in accordance with each experiment (206). The manager iterates through each experiment and its corresponding configuration identified at block 204. The experiment currently being performed is hereinafter referred to as "the selected experiment."

The manager generates an experiment ID based on a configuration for the selected experiment (208). As described in more detail in FIG. 3, the manager generates an experiment ID based on hashing parameters indicated in a configuration of the selected experiment. The experiment ID is stored in a database along with the configuration for the selected experiment.

The manager determines whether the experiment ID is unique (208). The manager compares the experiment ID to experiment IDs stored in the database. If the manager detects a match, the manager determines that the experiment ID is not unique and that the experiment has been previously executed. As a result, the manager does not continue with execution of the selected experiment. If the manager does not detect a match, the manager determines that the experiment has not been previously executed and that the experiment ID is unique.

If the experiment ID is unique, the manager executes the workflow in accordance with the selected experiment (212). The manager configures the resources needed for executing the workflow, e.g., models, program code, container images, input data, etc., in accordance with the configuration associated with the selected experiment. For example, the manager may retrieve a data set or instantiate a machine learning model identified in the configuration. Once the necessary resources are configured, the manager begins execution of the workflow.

The manager monitors execution of the workflow and stores results with the experiment ID (214). The manager may instantiate an agent or use tools of a container environment in which the workflow is executing to obtain performance metrics for the workflow such as process load, memory usage, etc. Additionally, the manager may analyze output data of the workflow and determine a degree of accuracy of the data. The manager stores the performance information in the databased along with the experiment ID. Additionally, the manager may store any output data or generated program code in files identified with the experiment ID. The generated program code may be code that describes the trained machine learning models for the workflow.

If the experiment ID is not unique or after executing and storing results of the workflow, the manager determines if there is an additional experiment (216). If there is an additional experiment, the manager selects the next experiment (206).

If there is not an additional experiment, the manager identifies an optimal configuration for the workflow based on experiment results (218). The manager can provide an output of experiment results in a user interface and allow a developer to sort the results based on desired performance metrics and select an experiment. For example, a developer may prioritize resource consumption over accuracy and sort the experiments based on an amount of processing resource consumed. Since the configuration was stored with an experiment ID, the manager can retrieve the configuration for the selected experiment. Additionally, the manager can automatically deploy a workflow to a specified location using the stored program code generated during execution of the experiment. Once the manager has identified the optimal configuration for the workflow, the process ends.

Figure 3:
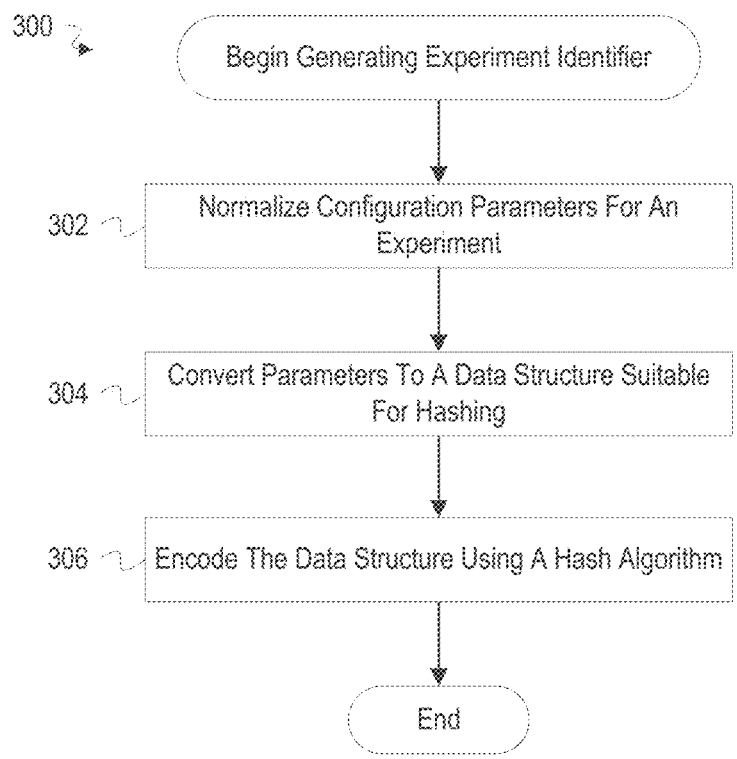
FIG. 3 depicts a flowchart with example operations for generating an experiment identifier.

FIG. 3 depicts a flowchart 300 with example operations for generating an experiment identifier. FIG. 3 refers to a manager as performing the operations for naming consistency with FIG. 1 and FIG. 2, although naming of program code can vary among implementations.

A machine learning workflow manager ("manager") normalizes configuration parameters for an experiment (302). The manager extracts parameters from a configuration file or other data structure which indicates settings or parameters for the workflow experiment. In addition to parameters indicated in the configuration file, the manager can retrieve other applicable parameters or attributes of the experiment. For example, the manager may retrieve a code version number from a versioning system of a code repository. The manager normalizes the parameters to ensure that parameters for each experiment are organized or formatted in a same manner prior to hashing. The normalization process can include removing parameters which are identified for exclusion from experiment IDs or can include reformatting or converting parameter values. For example, a first configuration file may indicate memory to be allocated to a container environment in megabytes, and a second configuration file may indicate memory in gigabytes. The manager can convert the megabytes value to be indicated in gigabytes. Normalization can also include sorting the parameters in alphabetical order.

The manager converts the parameters to a data structure suitable for hashing (304). For example, the manager may convert the parameters into a string data type. Prior to converting the parameters into a string, the manager may remove extraneous characters, such as new line characters or space characters, which may affect a resulting experiment ID value. For example, a first configuration file may include two spaces between each parameter and a second configuration file may have a single space. Extracting and hashing parameters from these files may result in different hash values even if parameter values are the same.

The manager encodes the data structure using a hash algorithm (306). The manager can use a hash algorithm such as SHA or MD5 or otherwise generate a signature or encoded representation of the data structure. Once the experiment ID has been generated, the process ends.

Figure 4:
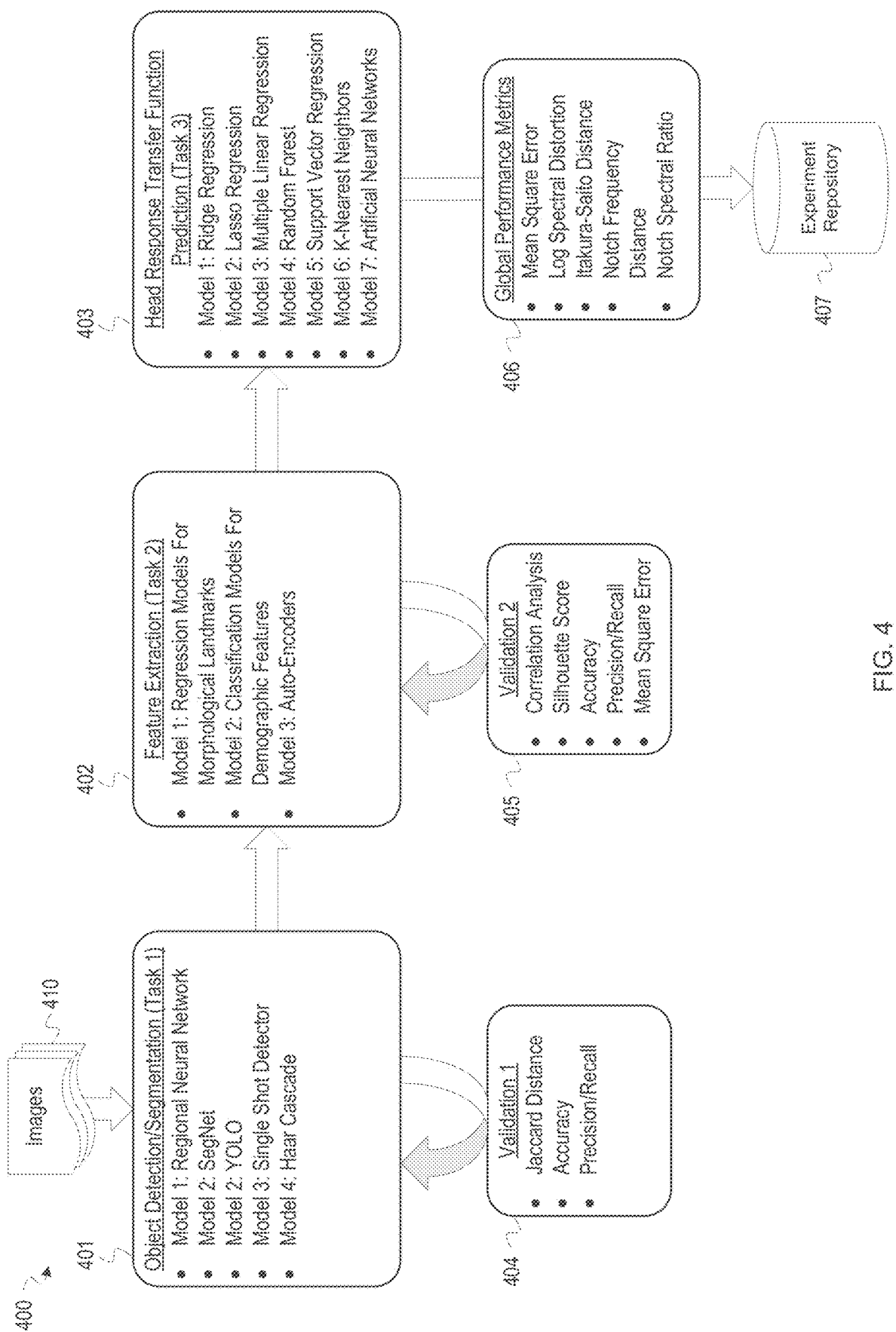
FIG. 4 depicts an example machine learning workflow for three-dimensional audio spatialization.

FIG. 4 depicts an example machine learning workflow 400 for three-dimensional audio spatialization. FIG. 4 depicts a task 1 401, a task 2 402, and a task 3 403. The machine learning tasks 1 401 and 2 401 include validation phases: a validation 1 404 and a validation 2 405, respectively. FIG. 1 also depicts images 410 which are included as input data into the task 1 401. After completion of the workflow 400 with the task 3 403, global performance metrics 406 are determined and stored in an experiment repository 407.

Personal audio delivery devices such as headphones, hearables, earbuds, speakers, and hearing aids may output sound directly into the human auditory system. For example, an earcup of a headphone may be placed on the pinna of a human ear and a transducer in the earcup may output sound into an ear canal of the human auditory system. However, the earcup may cover or partially cover the pinna. As a result, spatial localization of any sound may be impaired. The pinna might not interact with such sounds so as to generate audio cues to perceive the direction where the sound is coming from. Similar issues may exist for personal audio delivery systems in the form of bone conduction headsets. Bone conduction headsets may bypass the outer ear (pinna) all together, resulting in the pinna not generating audio cues.

In this case, the audio cues may be artificially generated to facilitate spatial localization in terms of elevation, distance and velocity. A non-linear transfer function, e.g., also referred to as a head related transfer function (HRTF), may facilitate generating the audio cues. The non-linear transfer function may characterize how sound is received by a human auditory system based on interaction with the pinna. The non-linear transfer function may be used to artificially generate the audio cues for determining azimuth, elevation, distance and/or velocity of a sound source. Each person may have differences in pinna, and similarly head size and torso. As a result, the non-linear transfer function for one user cannot be used for another user. Such a use would result in audio cues being generated such that the sound source is perceived coming from a different spatial location from where it is intended to be perceived.

The workflow depicted in FIG. 4 can be used to characterize a pinna of an individual to facilitate generating a non-linear transfer function, such as HRTF, for the individual. The non-linear transfer function may define how sound is transformed by the pinna for the individual. In turn, the non-linear transfer function may be used to artificially generate audio cues for spatializing sound both output and not output by the personal audio delivery device. With spatialization, the individual may be given a perception of sound coming from a certain direction, e.g., azimuth, elevation, distance and/or velocity, thereby improving the individual's experience with the personal audio delivery device in applications such as listening to music, virtual reality, and augmented virtual reality.

FIG. 4 depicts three cascading machine learning tasks for performing audio spatialization: the task 1 401 performs object detection segmentation of the head/ear from the images 410, the task 2 402 involves automatic feature extraction of certain human anatomy from the segmented images such as the head or pinna, and the task 3 403 involves prediction of the HRTF from the extracted features. Each of the machine learning tasks depicted in FIG. 4 include bullet points with potential machine learning models that may be utilized in completing that task. The task 1 401 for object detection/segmentation includes, for example, a regional neural network and a single shot detector as potential models. The task 2 402 for feature extraction includes, for example, regression models for identifying morphological landmarks associated with the human anatomy and auto-encoders as potential models. The task 3 403 for HRTF prediction includes, for example, ridge regression and multiple linear regression as potential models. A machine learning workflow manager can configure and execute the workflow 400 with various combinations of the models and other parameters. For example, the manager can execute an experiment that utilizes the single shot detector for the task 1 401, the auto-encoders for the task 2 402, and the ridge regression for the task 3 403. The manager can generate an experiment ID for each set of parameters/models utilized and store the experiment IDs in the experiment repository 407.

The validation 1 404 and the validation 2 405 include bullet points identifying various metrics which may be used to validate the outputs of the model used for the tasks 1 401 and 2 402, respectively. Additionally, the metrics 406 list metrics that can be used to globally validate the overall performance of the workflow 400. The metrics 406 are stored along with an experiment ID in the experiment repository 407. Although FIG. 4 depicts only the metrics 406 being stored in the experiment repository 407, metrics generated because of the validation 1 404 and the validation 2 405 can also be stored along with the experiment ID.

In some implementations, the manager may optimize each task individually prior to performing a global optimization of the workflow 400. The manager can experiment with various parameters for the task 1 401 and determine possible configurations based on which configurations are successfully validated by the validation 1 404. The manager can similarly determine possible configurations for the task 2 402 using the validation 2 402 and the task 3 403 using metrics from the metrics 406. After determining possible configurations for each task individually, the manager can generate various global configurations for the entire workflow 400. For example, the manager may select a first possible configuration from each task to generate a global configuration. The manager executes the workflow 400 using the possible configurations and tracks each experiment as described above. Ultimately, an optimal configuration for the workflow 400 is determined from among the various experiments based on the metrics 406.

Variations

The examples often refer to a machine learning workflow manager. The manager is a construct used to refer to implementation of functionality for tracking and coordinating multiple iterations of a machine learning workflow. This construct is utilized since numerous implementations are possible. A manager may be an application, an integrated development environment, a particular component or components of a machine (e.g., a particular circuit card enclosed in a housing with other circuit cards/boards), machine-executable program or programs (e.g., code development software), firmware, a circuit card with circuitry configured and programmed with firmware for executing machine learning workflows, etc. The term is used to efficiently explain content of the disclosure. The manager can also be referred to as a coordinator, workflow executor. Although the examples refer to operations being performed by a manager, different entities can perform different operations. For instance, a dedicated co-processor or application specific integrated circuit can perform a genetic algorithm for determining candidate solutions comprising parameters for a workflow.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 212 and 214 of FIG. 2 can be performed in parallel or concurrently. With respect to FIG. 3, the operations of block 304 may not be necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
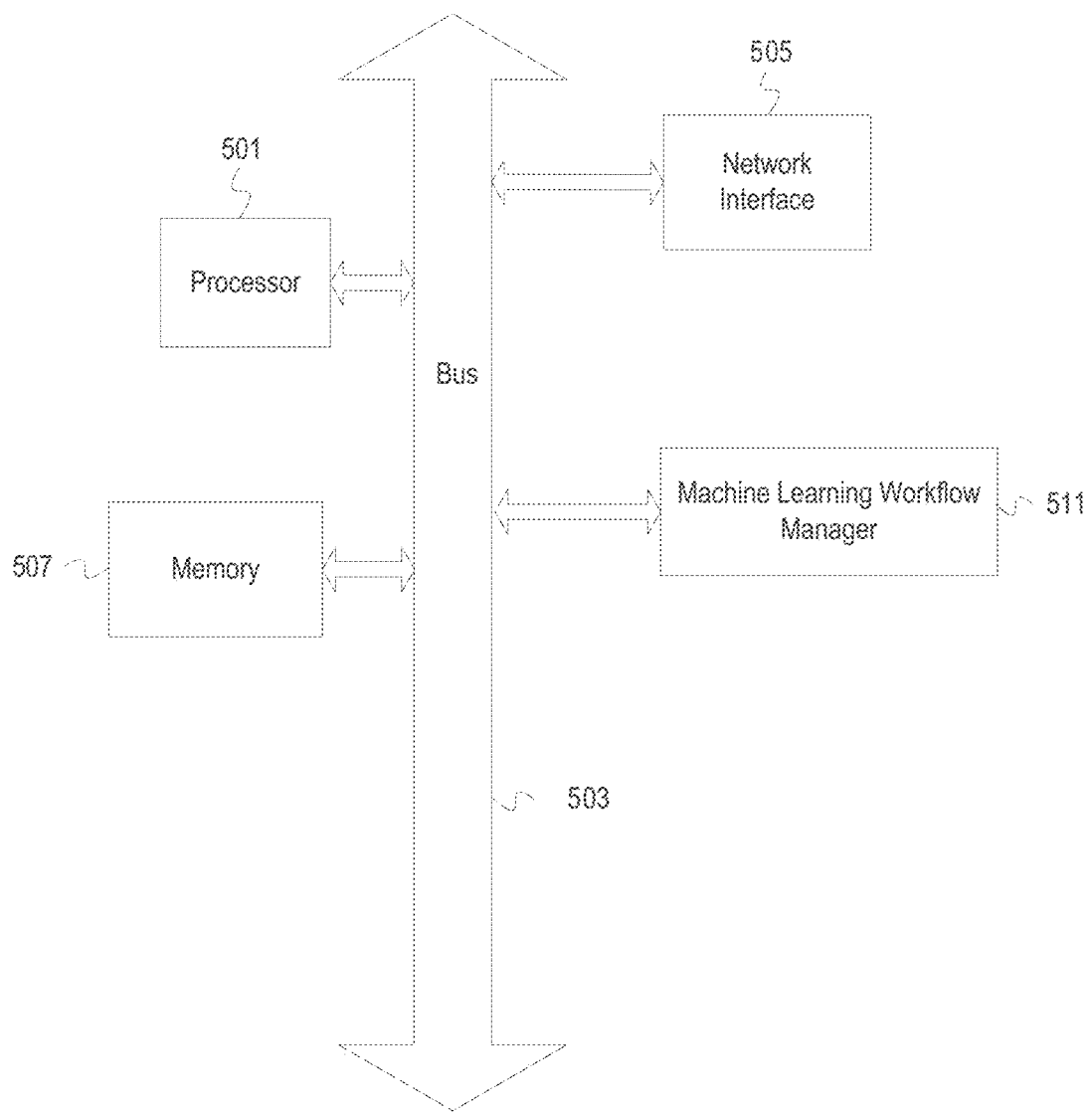
FIG. 5 depicts an example computer system with a machine learning workflow manager.

FIG. 5 depicts an example computer system with a machine learning workflow manager. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a machine learning workflow manager 511. The machine learning workflow manager 511 executes and tracks iterations of a machine learning workflow executed using differing parameters to identify an optimal configuration. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for identifying an optimal configuration for a machine learning workflow and tracking workflow experiments as described herein may be implemented with facilities consistent with any hardware system or hardware systems. Many variations, modifications, additions, and improvements are possible.

Example Embodiments

A. A method that includes determining a first configuration for a first machine learning workflow; generating a first identifier for the first configuration based, at least in part, on one or more parameters indicated in the first configuration; executing the first machine learning workflow in accordance with the first configuration; and recording results of the execution of the first machine learning workflow in accordance with the first configuration along with the first identifier.

B. A non-transitory, computer-readable medium having instructions stored thereon that are executable by a computing device to perform operations that include determining a set of configurations for one or more tasks of a machine learning workflow; for each configuration in the set of configurations, generating an identifier for the configuration based, at least in part, on parameters indicated in the configuration, executing the machine learning workflow in accordance with the configuration, and recording metrics related to the execution of the machine learning workflow in association with the identifier; and identifying an optimal configuration from the set of configurations for the machine learning workflow based, at least in part, on the metrics.

C. An apparatus that includes a database comprising identifiers associated with executions of a first machine learning workflow; a model repository comprising a plurality of machine learning models; a processor; and a computer-readable medium having instructions stored thereon that are executable by the processor. The instructions stored thereon that are executable by the processor cause the apparatus to determine a first configuration for the first machine learning workflow, wherein the first configuration specifies one or more models in the model repository; generate a first identifier for the first configuration based, at least in part, on one or more parameters indicated in the first configuration; execute the first machine learning workflow in accordance with the first configuration; and store results of the execution of the first machine learning workflow in accordance with the first configuration along with the first identifier in the database.

Each of the embodiments A, B, and C may have one or more of the following additional elements in any combination.

Element 1: wherein generating the first identifier for the first configuration based, at least in part, on the one or more parameters indicated in the first configuration comprises normalizing the one or more parameters from the first configuration; and encoding the one or more parameters to generate an identifier which is unique to the one or more parameters of the first configuration.

Element 2: further comprising prior to executing the first machine learning workflow, comparing the first identifier to a plurality of identifiers corresponding to previously utilized configurations; and determining that the first identifier does not match any of the plurality of identifiers.

Element 3: further comprising generating a second identifier for a second configuration for the first machine learning workflow; comparing the second identifier to a plurality of identifiers corresponding to previously utilized configurations; and based on determining that the second identifier matches an identifier in the plurality of identifiers, preventing execution of the first machine learning workflow in accordance with the second configuration.

Element 4: further comprising executing the first machine learning workflow in accordance with a second configuration; and determining an optimal configuration for the first machine learning workflow based, at least in part, on comparing results of the execution of the first machine learning workflow in accordance with the second configuration to the results of the execution of the first machine learning workflow in accordance with the first configuration.

Element 5: wherein determining the first configuration for the first machine learning workflow comprises determining a set of potential values for at least a first parameter and a second parameter for the first machine learning workflow; and selecting, from the set of potential values, a value for the first parameter and a value for the second parameter.

Element 6: further comprising generating a plurality of configurations for the first machine learning workflow based, at least in part, on determining unique combinations of values for the first parameter and the second parameter from the set of potential values.

Element 7: wherein executing the first machine learning workflow in accordance with the first configuration comprises instantiating one or more machine learning models identified in the first configuration within a container environment; and inputting data identified in the first configuration into the one or more machine learning models.

Element 8: wherein recording the results of the first machine learning workflow comprises recording at least one of performance metrics, program code, and output data.

Element 9: wherein the one or more tasks comprise tasks for performing audio spatialization, wherein at least a first configuration of the set of configurations identifies machine learning models to be used for generating a head response transfer function prediction for the audio spatialization.

Element 10: wherein the tasks for performing the audio spatialization comprise an object detection and segmentation task, a feature extraction task, and a head response transfer function prediction task.

By way of non-limiting example, exemplary combinations applicable to A, B, and C include Element 6 with Element 5 and Element 10 with Element 9.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   determining a first configuration for tasks of a first machine learning workflow characterizing a pinna to predict a head related transfer function defining transformation of sound by the pinna, wherein each task uses a set of machine learning models, and wherein the first machine learning workflow comprises combinations of the machine learning models from the sets;
   generating a first identifier for the first configuration based, at least in part, on one or more parameters indicated in the first configuration by:
   normalizing the one or more parameters from the first configuration, wherein the normalizing comprises converting the one or more parameters to a data structure suitable for hashing, wherein the converting comprises one or more of organizing and formatting the one or more parameters, and wherein the organizing and formatting comprises one or more of removing a parameter, sorting the one or more parameters, and removing one or more characters from the one or more parameters; and
   encoding the normalized one or more parameters using a hashing algorithm to generate the first identifier which is unique to the one or more parameters of the first configuration;
   executing the first machine learning workflow in accordance with the first configuration; and
   recording results of the execution of the first machine learning workflow in accordance with the first configuration along with the first identifier.

2. The method of claim 1 further comprising:
   prior to executing the first machine learning workflow, comparing the first identifier to a plurality of identifiers corresponding to previously utilized configurations; and
   determining that the first identifier does not match any of the plurality of identifiers.

3. The method of claim 1 further comprising:
   generating a second identifier for a second configuration for the first machine learning workflow;
   comparing the second identifier to a plurality of identifiers corresponding to previously utilized configurations; and
   based on determining that the second identifier matches an identifier in the plurality of identifiers, preventing execution of the first machine learning workflow in accordance with the second configuration.

4. The method of claim 1 further comprising:
   executing the first machine learning workflow in accordance with a second configuration; and
   determining an optimal configuration for the first machine learning workflow based, at least in part, on comparing results of the execution of the first machine learning workflow in accordance with the second configuration to the results of the execution of the first machine learning workflow in accordance with the first configuration.

5. The method of claim 1, wherein determining the first configuration for the first machine learning workflow comprises:
   determining a set of potential values for at least a first parameter and a second parameter for the first machine learning workflow; and
   selecting, from the set of potential values, a value for the first parameter and a value for the second parameter.

6. The method of claim 5 further comprising generating a plurality of configurations for the first machine learning workflow based, at least in part, on determining unique combinations of values for the first parameter and the second parameter from the set of potential values.

7. The method of claim 1, wherein executing the first machine learning workflow in accordance with the first configuration comprises:
- instantiating one or more machine learning models identified in the first configuration within a container environment; and
- inputting data identified in the first configuration into the one or more machine learning models.

8. The method of claim 1, wherein recording the results of the first machine learning workflow comprises recording at least one of performance metrics, program code, and output data.

9. A non-transitory, computer-readable medium having instructions stored thereon that are executable by a computing device to perform operations comprising:
- determining a set of configurations for one or more tasks of a machine learning workflow, wherein the tasks comprise an object detection and segmentation task to be performed using a first set of machine learning models, a feature extraction task to be performed using a second set of machine learning models, and a head response transfer function prediction task to be performed using a third set of machine learning models; and wherein the machine learning workflow comprises combinations of the machine learning models in the first, second, and third sets;
- for each configuration in the set of configurations, generating an identifier for the configuration based, at least in part, on parameters indicated in the configuration by:
- normalizing the parameters from each configuration, wherein the normalizing comprises converting the parameters to a data structure suitable for hashing, wherein the converting comprises one or more of organizing and formatting the parameters, and wherein the organizing and formatting comprises one or more of removing a parameter, sorting the parameters, and removing one or more characters from the parameters; and
- encoding the normalized parameters using a hashing algorithm to generate the identifier which is unique to the parameters of each configuration;
- executing the machine learning workflow in accordance with the configuration; and
- recording metrics related to the execution of the machine learning workflow in association with the identifier; and
- identifying an optimal configuration from the set of configurations for the machine learning workflow based, at least in part, on the metrics.

10. An apparatus comprising:
- a database comprising identifiers associated with executions of a first machine learning workflow;
- a model repository comprising a plurality of machine learning models;
- a processor; and
- a computer-readable medium having instructions stored thereon that are executable by the processor to cause the apparatus to, determine a first configuration for tasks of the first machine learning workflow characterizing a pinna to predict a head related transfer function defining transformation of sound by the pinna, wherein each task uses a set of machine learning models, wherein the first machine learning workflow comprises combinations of the machine learning models from the sets, and wherein the first configuration specifies one or more of the machine learning models in the model repository;
- generate a first identifier for the first configuration based, at least in part, on one or more parameters indicated in the first configuration by:
- normalizing the one or more parameters from the first configuration, wherein the normalizing comprises converting the one or more parameters to a data structure suitable for hashing, wherein the converting comprises one or more of organizing and formatting the one or more parameters, and wherein the organizing and formatting comprises one or more of removing a parameter, sorting the one or more parameters, and removing one or more characters from the one or more parameters; and
- encoding the normalized one or more parameters using a hashing algorithm to generate the first identifier which is unique to the one or more parameters of the first configuration;
- execute the first machine learning workflow in accordance with the first configuration; and
- store results of the execution of the first machine learning workflow in accordance with the first configuration along with the first identifier in the database.

11. The apparatus of claim 10 further comprising instructions to:
- prior to execution the first machine learning workflow, compare the first identifier to a plurality of identifiers corresponding to previously utilized configurations; and
- determine that the first identifier does not match any of the plurality of identifiers.

12. The apparatus of claim 10 further comprising instructions to:
- generate a second identifier for a second configuration for the first machine learning workflow;
- compare the second identifier to a plurality of identifiers corresponding to previously utilized configurations; and
- based on a determination that the second identifier matches an identifier in the plurality of identifiers, prevent execution of the first machine learning workflow in accordance with the second configuration.

13. The apparatus of claim 10 further comprising instructions to:
- execute the first machine learning workflow in accordance with a second configuration; and
- determine an optimal configuration for the first machine learning workflow based, at least in part, on comparing results of the execution of the first machine learning workflow in accordance with the second configuration to the results of the execution of the first machine learning workflow in accordance with the first configuration.

14. The apparatus of claim 10, wherein the instructions to determine the first configuration for the first machine learning workflow comprises instructions to:
- determine a set of potential values for at least a first parameter and a second parameter for the first machine learning workflow; and
- select, from the set of potential values, a value for the first parameter and a value for the second parameter.

15. The apparatus of claim 14 further comprising instructions to generate a plurality of configurations for the first machine learning workflow based, at least in part, on determining unique combinations of values for the first parameter and the second parameter from the set of potential values.

16. The apparatus of claim 10, wherein the instructions to executing the first machine learning workflow in accordance with the first configuration comprises instructions to:
  instantiate one or more machine learning models identified in the first configuration within a container environment; and
  input data identified in the first configuration into the one or more machine learning models.

\* \* \* \* \*